US012645216B2

(12) United States Patent
Hart et al.

(10) Patent No.: US 12,645,216 B2
(45) Date of Patent: Jun. 2, 2026

(54) METHOD OF CONTROLLING AUTONOMOUS VEHICLES FOR DELIVERING A PAYLOAD TO AN INTENDED DELIVERY LOCATION

(71) Applicant: BRITISH TELECOMMUNICATIONS PUBLIC LIMITED COMPANY, London (GB)

(72) Inventors: Jonathan Hart, London (GB); Maria Cuevas Ramirez, London (GB); Ruth Brown, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 203 days.

(21) Appl. No.: 17/915,443

(22) PCT Filed: Feb. 16, 2021

(86) PCT No.: PCT/EP2021/053796
§ 371 (c)(1),
(2) Date: Sep. 28, 2022

(87) PCT Pub. No.: WO2021/197705
PCT Pub. Date: Oct. 7, 2021

(65) Prior Publication Data
US 2023/0143971 A1 May 11, 2023

(30) Foreign Application Priority Data
Mar. 30, 2020 (EP) .................................... 20166653

(51) Int. Cl.
*G05D 1/00* (2006.01)

(52) U.S. Cl.
CPC ......... *G05D 1/0027* (2013.01); *G05D 1/0022* (2013.01); *G05D 1/0206* (2013.01); *G05D 1/0291* (2013.01); *G05D 1/104* (2013.01)

(58) Field of Classification Search
CPC .. G05D 1/0027; G05D 1/0022; G05D 1/0206; G05D 1/0291; G05D 1/104
See application file for complete search history.

(56) References Cited

U.S. PATENT DOCUMENTS

| | | | |
|---|---|---|---|
| 9,786,187 B1 * | 10/2017 | Bar-Zeev | ............... G05D 1/104 |
| 9,792,576 B1 | 10/2017 | Jamjoom et al. | |

(Continued)

FOREIGN PATENT DOCUMENTS

| | | |
|---|---|---|
| CN | 109478306 | 3/2019 |
| JP | 2018-165932 | 10/2018 |

(Continued)

OTHER PUBLICATIONS

Ty Nguyen, et al., "Extending the Range of Delivery Drones by Exploratory Learning of Energy Models (Extended Abstract)", AAMAS '17: Proceedings of the 16th Conference on Autonomous Agents and MultiAgent Systems, May 8-12, 2017, pp. 1658-1660 (3 pages).

(Continued)

*Primary Examiner* — Navid Z. Mehdizadeh
*Assistant Examiner* — Matthew Ho
(74) *Attorney, Agent, or Firm* — Nixon & Vanderhye P.C.

(57) ABSTRACT

A computer-implemented method of controlling Autonomous Vehicles for delivering a payload to an intended delivery location comprising: identifying a first AV for retrieving a payload from a first location; determining a second location to which the first AV is capable of travelling with the payload from the first location; instructing the first AV to retrieve the payload from the first location and to (Continued)

deliver the payload to the second location; communicating a wireless communication requesting assistance from another AV to deliver the payload from the second location, wherein the wireless communication is in the form of a system information message; in response to the wireless communication, identifying a second AV for retrieving the payload from the second location; and instructing the second AV to retrieve the payload from the second location and to deliver the payload to the intended delivery location.

19 Claims, 4 Drawing Sheets

(56) References Cited

U.S. PATENT DOCUMENTS

| | | | | |
|---|---|---|---|---|
| 10,241,516 | B1 | 3/2019 | Brady et al. | |
| 10,514,690 | B1* | 12/2019 | Siegel | G05D 1/0027 |
| 10,616,734 | B1* | 4/2020 | Lekutai | H04W 4/027 |
| 2013/0070636 | A1 | 3/2013 | Farley et al. | |
| 2016/0364823 | A1 | 12/2016 | Cao | |
| 2016/0378108 | A1 | 12/2016 | Paczan et al. | |
| 2018/0059659 | A1* | 3/2018 | Takeuchi | G05D 1/0061 |
| 2018/0137454 | A1 | 5/2018 | Kulkarni et al. | |
| 2018/0196422 | A1 | 7/2018 | Chow et al. | |
| 2018/0248613 | A1* | 8/2018 | Peitzer | H04B 17/12 |
| 2018/0276993 | A1 | 9/2018 | Chow et al. | |
| 2019/0039731 | A1* | 2/2019 | Marcath | B64F 1/007 |
| 2019/0100307 | A1 | 4/2019 | Beltman et al. | |
| 2019/0108472 | A1 | 4/2019 | Sweeney et al. | |
| 2019/0180237 | A1 | 6/2019 | Mattingly et al. | |
| 2019/0295426 | A1 | 9/2019 | Nilsson et al. | |
| 2020/0019925 | A1 | 1/2020 | Tokhtabaev | |
| 2020/0027346 | A1* | 1/2020 | Lisewski | G08G 1/096791 |
| 2021/0241228 | A1* | 8/2021 | Tazume | G06Q 10/08355 |
| 2021/0274325 | A1* | 9/2021 | Legg | H04W 72/04 |

FOREIGN PATENT DOCUMENTS

| | | |
|---|---|---|
| WO | 2018/012767 | 1/2018 |
| WO | 2018/065977 | 4/2018 |
| WO | 2019/078815 | 4/2019 |
| WO | 2019/181896 | 9/2019 |

OTHER PUBLICATIONS

Combined Search and Examination Report for GB Application No. 2004579.5 dated Aug. 24, 2020, 9 pages.
Extended European Search Report for GB Application No. 20166653.4 dated Sep. 11, 2020, 10 pages.
International Search Report for PCT/EP2021/053796 dated Mar. 19, 2021, 3 pages.
Written Opinion of the ISA for PCT/EP2021/053796 dated Mar. 19, 2021, 9 pages.
Communication pursuant to Article 94(3) EPC dated Jul. 10, 2023, issued for European Application No. 21 704 819.8 (4 pages).
First Notification of Office Action dated Dec. 31, 2024, issued for Chinese Application No. 202180020157.9 (9 pages).

* cited by examiner

METHOD OF CONTROLLING AUTONOMOUS VEHICLES FOR DELIVERING A PAYLOAD TO AN INTENDED DELIVERY LOCATION

CROSS-REFERENCE TO RELATED APPLICATIONS

This application is the U.S. national phase of International Application No. PCT/EP2021/053796 filed Feb. 16, 2021 which designated the U.S. and claims priority to EP Patent Application No. 20166653.4 filed Mar. 30, 2020, the entire contents of each of which are hereby incorporated by reference.

FIELD OF INVENTION

The present invention relates to a method of controlling Autonomous Vehicles.

BACKGROUND

Autonomous Vehicles (AVs), such as autonomous cars or drones, may be used for logistics. In particular, such AVs may be used to deliver packages from a distribution centre to a delivery point.

In many cases, aerial AVs source electrical power for propulsion from an internal battery. Such AVs therefore have limited travel range due to limited battery supply, typically providing less than an hour's worth of travel, and in many cases only 20-30 minutes. This significantly limits the logistical uses of such AVs.

As a result, it may be necessary to use multiple AVs to perform a task; this, however, requires co-ordinating the AVs, which in turn requires the AVs to be able to communicate information effectively. To this end, an AV may be provided with telecommunications equipment for accessing a wireless cellular telecommunications network. However, a cellular network may fail or may not be available in the vicinity of the AV, in which case it may no longer be possible effectively to coordinate AVs so as to work in unison to perform long-distance (i.e. beyond the travel range of an AV) deliveries of packages.

In view of the above, it is an aim of the present invention at least to alleviate some of the aforementioned problems.

STATEMENTS OF INVENTION

According to a first aspect of the present invention, there is provided: a computer-implemented method of controlling Autonomous Vehicles (AVs) for delivering a payload to an intended delivery location comprising the steps of: identifying a first AV for retrieving a payload from a first location; determining a second location to which the first AV is capable of travelling with the payload from the first location; instructing the first AV to retrieve the payload from the first location and to deliver the payload to the second location, wherein the wireless communication is in the form of a system information message; communicating a wireless communication requesting assistance from another AV to deliver the payload from the second location; in response to the wireless communication, identifying a second AV for retrieving the payload from the second location; and instructing the second AV to retrieve the payload from the second location and to deliver the payload to the intended delivery location.

Optionally, the step of identifying the second AV is performed prior to or after instructing the first AV. Optionally, the second AV is located at the second location or is located away from the second location prior to instructing the second AV. Optionally, the second location is determined in dependence upon a location of the second AV. Preferably, the method further comprises the step of identifying that the first AV is incapable of delivering the payload to the intended delivery location, but that the first AV is capable of travelling away from the first location with the payload.

Optionally, said system information message is transmitted by a radio access point of a cellular telecommunications network. Preferably, the system information message is capable of being received and processed by the first and/or second AV without registering, being able to register and/or establishing a network data session, with the cellular telecommunications network. Preferably, as used herein, the term "system information message" includes any communication for configuring (but not necessarily establishing) ongoing telecommunications, and in particular at a physical layer of networking. The system information message may be an overhead communication. Preferably, the system information message includes a Master Information Block (MIB) and/or a System Information Block (SIB) message, for example as described in 3GPP Technical Specification 36.331, version 15.4.0, section 5.2, said System Information Block (SIB) may be in the form of any of a Type 1 to 13 SIB, and preferably it is in the form of a Type 1 SIB. Preferably, the wireless communication is transmitted within a portion of the electro-magnetic spectrum that is licensed (or exclusively permitted) for wide area telecommunications, and in particular for cellular telecommunication. Preferably, the first AV and the second AV are only subscribed to different telecommunications networks to one another. Optionally, the wireless communication is communicated and/or received by means of a PC5 interface.

Preferably, the wireless communication is communicated by a radio access point of a cellular telecommunications network, and wherein the first AV is registered with said radio access point.

Optionally, the radio access point is the most proximate to the first and/or second AV/s. Optionally, the wireless communication is communicated by a plurality of radio access points, wherein said plurality of radio access points are arranged around or are centred about the first AV. Preferably, the second AV is not registered with said radio access point and more preferably is incapable of registering with said radio access point.

Optionally, the step of instructing the second AV is performed by means of a wireless communication in the form of a system information message.

Preferably, the wireless communication is received by the second AV via at least one intermediate AV. Preferably, the wireless communication comprises the second location and/or the intended delivery location.

Preferably, the second location is determined in dependence upon a maximum travel range of the first AV.

Preferably, the method further comprises the step of retrieving capability information regarding a capability of the second AV to retrieve the payload and to deliver said payload to the intended delivery location, and identifying and/or instructing the second AV in dependence on said capability information. Optionally, said capability information is retrieved by means of a device-to-device communication from the second AV to the first AV.

Preferably, the step of determining the second location is performed by the first AV. Optionally, said determining is performed by a remote processor, and wherein the first AV is in wireless communication with the remote processor.

Preferably, the step/s of identifying and/or instructing the second AV is/are performed by the first AV. Optionally, said identifying is performed by a remote processor, and wherein the first AV is in wireless communication with the remote processor.

Preferably, the step of identifying the second AV further comprises the steps of: broadcasting the wireless communication; and in response to the wireless communication, receiving a reply from the second AV, wherein the second AV is identified in dependence on the reply.

Preferably, the response comprises: an availability of the second AV; a travel range of the second AV; a current location of the second AV; and/or a capability of the second AV to carry payloads. Optionally, the method comprises the step of receiving a plurality of replies to the broadcast wireless communication from a respective plurality of AVs, and wherein the second AV is selected from said plurality of AVs in dependence on the reply from the second AV.

Preferably, the second location is closer to the intended delivery location than the first location.

Preferably, the first AV is carrying one or more payload/s to one or more intended delivery location/s, and wherein a plurality of second AVs are identified and instructed to retrieve and to deliver the one or more payload/s to the one or more intended delivery location/s.

Preferably, the wireless communication comprises a priority level for a delivery, and wherein said identifying is performed in dependence on said priority level.

Optionally, the second AV is available to be identified and instructed in dependence on the priority level so as to override a current task in which the second AV is engaged, and for example another delivery.

Preferably, the first and/or the second AV is/are unmanned. Preferably, the first and/or the second AV is/are an aerial, marine and/or ground vehicle/s.

According to another aspect of the invention, there is provided a storage medium carrying computer-readable code representing instructions for causing at least one processor to perform the method described above when the instructions are executed by the at least one processor.

The invention includes any novel aspects described and/or illustrated herein. The invention also extends to methods and/or apparatus substantially as herein described and/or as illustrated with reference to the accompanying drawings. The invention is also provided as a computer program and/or a computer program product for carrying out any of the methods described herein and/or for embodying any of the apparatus features described herein, and a computer-readable medium storing thereon a program for carrying out any of the methods and/or for embodying any of the apparatus features described herein. Features described as being implemented in hardware may alternatively be implemented in software, and vice versa.

The invention also provides a method of transmitting a signal, and a computer product having an operating system that supports a computer program for performing any of the methods described herein and/or for embodying any of the apparatus features described herein.

Any apparatus feature may also be provided as a corresponding step of a method, and vice versa. As used herein, means plus function features may alternatively be expressed in terms of their corresponding structure, for example as a suitably-programmed processor.

Any feature in one aspect of the invention may be applied, in any appropriate combination, to other aspects of the invention. Any, some and/or all features in one aspect can be applied to any, some and/or all features in any other aspect, in any appropriate combination. Particular combinations of the various features described and defined in any aspects of the invention can be implemented and/or supplied and/or used independently.

As used throughout, the word 'or' can be interpreted in the exclusive and/or inclusive sense, unless otherwise specified.

The invention extends to a method of controlling Autonomous Vehicles as described herein and/or substantially as illustrated with reference to the accompanying drawings. The present invention is now described, purely by way of example, with reference to the accompanying diagrammatic drawings, in which.

SPECIFIC DESCRIPTION

Figure 1:
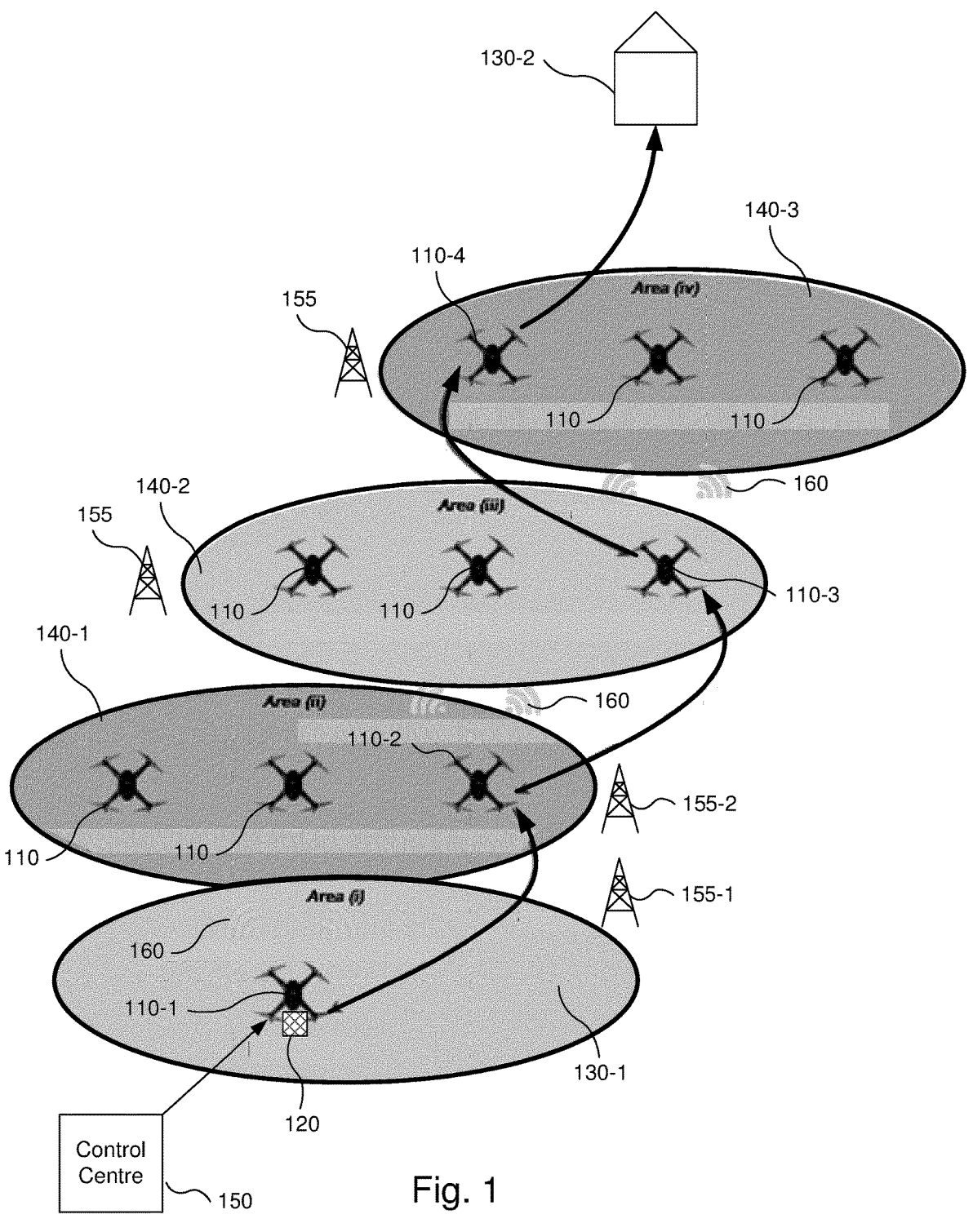
FIG. 1 shows a schematic diagram of a plurality of Autonomous Vehicles (AVs) delivering a payload in relay.

FIG. 1 shows a plurality of Autonomous Vehicles (AVs) 110, in the form of unmanned aerial vehicles (or so-called "drones"), that are instructed to deliver a payload 120 from a starting point 130-1 (such as a parcel distribution centre) to an intended final delivery destination 130-2 (such as a recipient's address). The AVs comprise wireless telecommunications equipment (not shown), such as to be able to communicate with a cellular wireless telecommunication network, and in particular with constituent radio access points 155 of the telecommunication network.

There is provided a process 200 for delivering the payload 120 to the intended destination 130-2 by means of the plurality of AVs 110 working in relay; this process is shown in, and described with reference to, FIG. 2.

The plurality of AVs includes a first AV 110-1. In a first step 210, the first AV 110-1 is selected and instructed to retrieve the payload 120 from the starting point 130-1; this selection and instruction is performed by a Control Centre 150 for managing the plurality of AVs 110.

Figure 2:
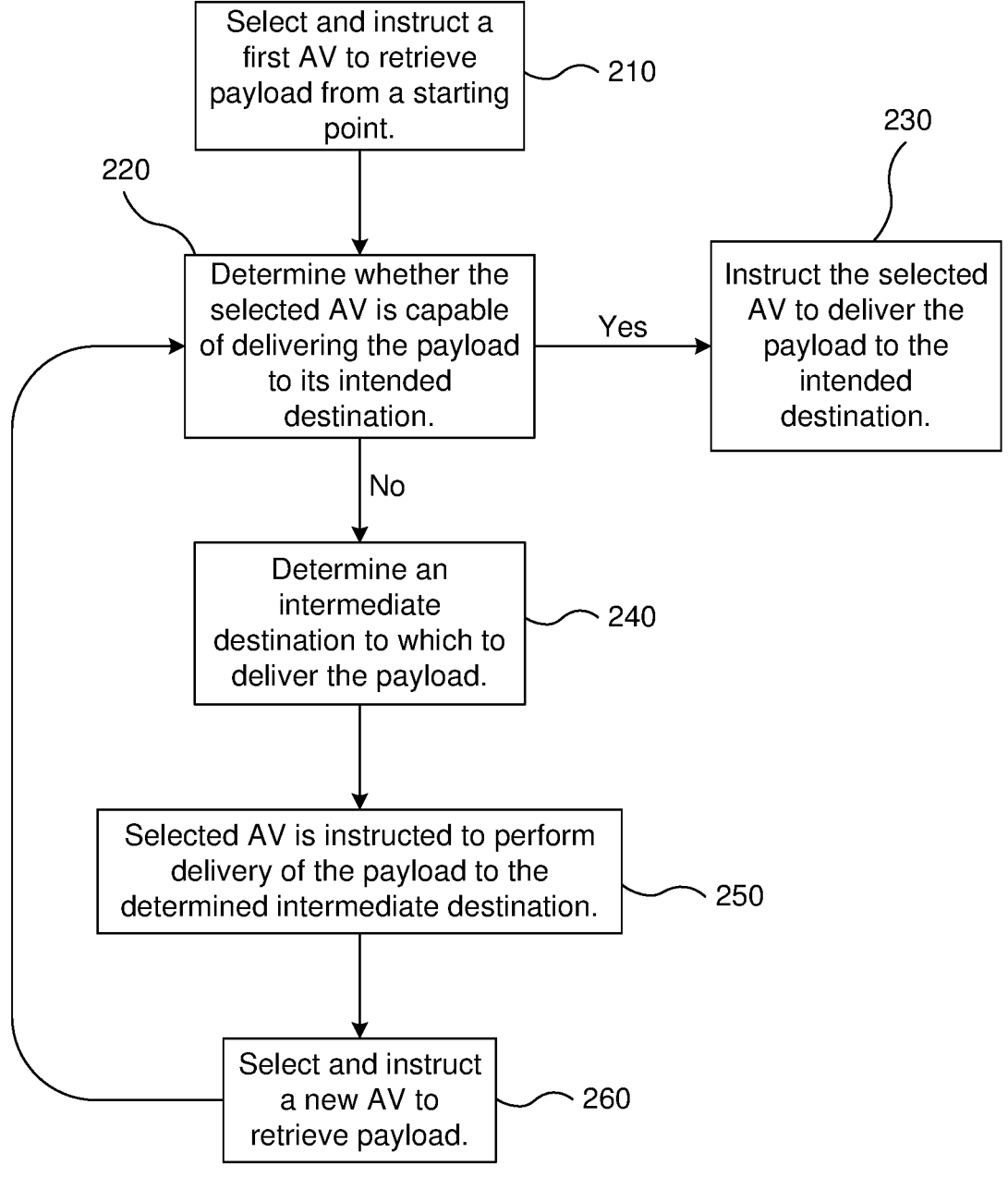
FIG. 2 shows a process for controlling the AVs so as to perform the delivery.

As shown in FIG. 2, at a next step 220, a determination is made as to whether or not the first AV 110-1 is capable of delivering the retrieved payload 120 to the intended destination 130-2. In one example, step 220 is performed prior to commencement of, or during, delivery of the payload by the first AV 110-1.

If it is determined that the first AV 110-1 is capable of delivering the payload to the intended destination 130-2 from the starting point 130-1, then the first AV 110-1 is instructed to do so at step 230.

However, if it is determined that the first AV 110-1 is incapable of delivering the payload to the intended destination 130-2 from the starting point 130-1, then process 200 continues to step 240. For example, the first AV 110-1 may be incapable of delivering the payload 120 to the intended destination 130-2 in a single charge because the travel range of the first AV 110-1 is less than the distance to the intended destination 130-2.

At step 240, processing is performed so as to determine a suitable intermediate destination 140 that is within a travel range of the first AV 110-1 and that brings the payload closer to the intended destination 130-2.

Accordingly, a first intermediate destination 140-1 is identified for the first AV 110-1, and at step 250 the first AV is instructed to perform delivery of the payload from the starting point 130-1 to the first intermediate destination 140-1.

At a next step 260, a successor—second—AV 110-2 is identified and instructed, by means of a wireless communication 160, to retrieve the payload 120 from the first intermediate destination 140-1.

Process 200 then reiterates to step 220, and the process continues to reiterate until the payload 120 is delivered to the intended destination 130-2.

In a first reiteration of process 200, at step 220, a determination is made as to whether the second AV 110-2 is capable of delivering the payload 120 from the first intermediate destination 140-1 to the intended destination 130-2 in a single charge; in the example of FIG. 1, it is determined that the second AV 110-2 is incapable of doing so.

Subsequently, at step 240, a second intermediate destination 140-2 is identified to which the second AV 110-2 is capable of travelling and that brings the payload still closer to the intended destination 130-2. Accordingly, the second AV 110-2 then performs delivery of the payload to the second intermediate destination 140-2, as per step 250.

At a first reiteration of step 260, a third AV 110-3 is identified and instructed to retrieve the payload 120 from the second intermediate destination 140-2, as delivered by the second AV 110-2.

In a corresponding manner to the first 110-1 and the second 110-2 AVs, and in a further reiteration of process 200, the third AV 110-3 delivers the payload 120 to a third intermediate destination 140-3.

Likewise, in yet a further reiteration of process 200, at the third intermediate destination 140-3, a fourth AV 110-4 retrieves the payload 120. The fourth AV 110-4 is determined to be capable of delivering the payload to the intended destination 130-2 on its own, as identified at step 220. Accordingly, the fourth AV is instructed to deliver the payload 10 to the intended destination 130-2, and process 200 is then available to terminate.

Steps 220, 240 and/or 260 are available to be performed by the AV that is, in a current iteration of process 200, selected to retrieve the payload; and/or by the Control Centre 150, which wirelessly communicates (for example, by means of the cellular wireless telecommunication network) results of such processing steps to the AV that is selected to retrieve the payload 120.

The wireless communications 160 are used to coordinate the plurality of AVs 110 so as to: identify appropriate AVs to retrieve the payload; communicate the intermediate destinations to AVs; perform payload handover; and communicate information regarding the delivery of the payload, such as the intended destination 130-2 of the payload.

Figure 3:
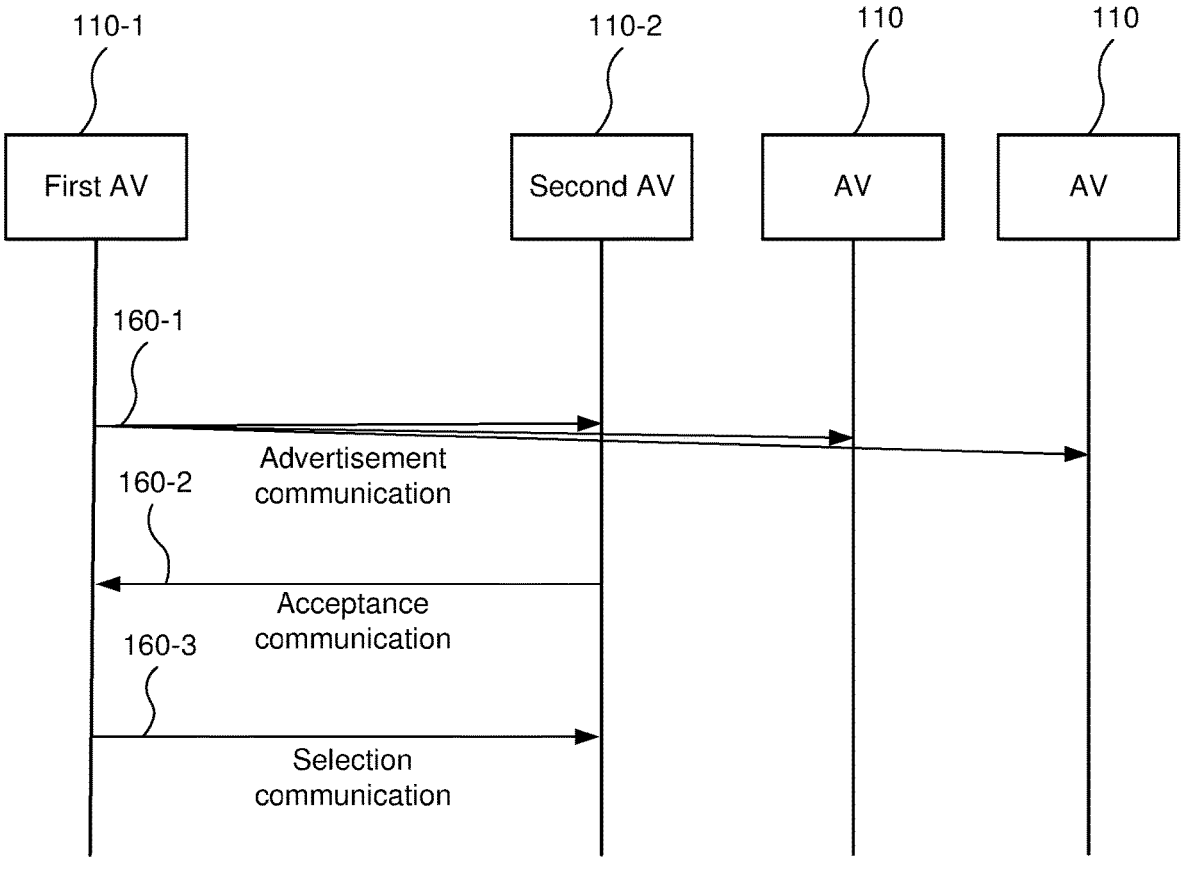
FIGS. 3 and 4 are flow diagrams showing communication processes for controlling the AVs to perform the delivery.
Figure 4:
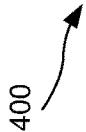

FIGS. 3 and 4 show flow diagrams of the wireless communications 160 for identifying and instructing an AV to assist with delivery of the payload 120, as per step 260 in process 200.

FIG. 3 is a flow diagram showing a process 300 of communicating the wireless communication 160, wherein said wireless communication 160 is in the form of at least one device-to-device communication. In particular, the device-to-device communication complies with the LTE Direct protocol, and is communicated using, for example, a PC5 interface that forms part of the wireless telecommunications equipment (not shown) of the AVs 110. In particular, the device-to-device communication complies with 3GPP Technical Specification 23.285, release 16, version 16.2.0, and particularly section 4.2.1, the contents of which are hereby incorporated by reference. In one example, the device-to-device communication is specifically in the form of a cellular V2X communication, and in particular a cellular V2V communication.

In a first step of process 300, the first AV 110-1 broadcasts an advertisement communication 160-1 that requests assistance from another AV to deliver the payload 120. The advertisement communication is broadcast on a repeating basis, for example, every 5 seconds.

The advertisement communication 160-1 comprises, at least, the first intermediate destination 140-1 and the intended destination 130-2.

Since the advertisement communication 160-1 is in the form of a device-to device communication, the advertisement communication 160-1 is available to be received directly by a plurality of AVs 110 (herein, each a "receiving AV"), in which each of the receiving AVs is within a reception range of the first AV 110-1, including the second AV 110-2 (albeit, which, at this point, has yet to be identified as the AV that is to succeed the first AV in delivery of the payload).

Upon receipt of the advertisement communication 160-1 by the receiving AVs 110, processing is performed by each individual receiving AV to determine whether it is suitable for retrieving the payload 120 from the first intermediate destination 140-1. For example, the receiving AVs perform processing to identify whether: the first intermediate destination is too far from its current destination, given a current travel range; the receiving AV is presently, or will be, available to undertake delivery; and/or—where the advertisement communication comprises such information—if the dimensions and/or mass of the payload 120 is/are too great for the receiving AV.

If a receiving AV determines that it is suitable to retrieve the payload 120, such a receiving AV responds (herein, each a "responding AV") to the advertisement communication 160-1 with an acceptance communication 160-2 to identify itself to the first AV 110-1 as being capable of assisting with delivering the payload; this acceptance communication 160-2 is issued by the second AV 110-2. If not, then the receiving AV does not issue any response.

The acceptance communication 160-2 is received directly by the first AV 110-1, following which the first AV 110-1 ceases broadcasting of the advertisement communication 160-1.

Based on the acceptance communication(s) 160-2 received by the first AV 110-1, the first AV 110-1 selects one of the responding AVs (herein, a "selected AV") to succeed the first AV in continuing delivery of the payload 120, and communicates this selection to the second AV via a selection communication 160-3.

In the example of FIG. 3, each of the communications 160 are device-to-device communications and are therefore communicated directly between the pluralities of AVs 110 without the communication traversing a cellular telecommunications network (including radio access points 155). Advantageously, this improves communication access and efficiency between the AVs, and in particular where a cellular telecommunications network is unavailable or unreliable, such as in remote areas, or where an AV is unable to register with a cellular telecommunications network, for example where roaming is impermissible.

FIG. 4 is a flow diagram showing a process 400 of communicating the wireless communication 160, in which the communication 160 includes at least one modified system information message.

In the example of FIG. 4, it is identified that the first AV 110-1 is incapable of delivering the payload 120 to its intended destination (as per step 220 of FIG. 2); this, or information that enables such a conclusion to be drawn, is communicated by the first AV 110-1 to a first radio access point 155-1 by means of an alerting communication 160-4. The alerting communication 160-4 is communicated from the first AV 110-1 to a first radio access point 155-1 via a data bearer session. This is achieved given that the first AV 110-1 is within a communication range of the first radio access point 155-1 and given that the first AV 110-1 is a subscriber of a first telecommunications network (not shown) with which the first radio access point 155-1 is associated.

In response to the alerting communication 160-4, the first radio access point 155-1 broadcasts an advertisement communication 160-1 that requests assistance from another AV to deliver the payload 120; this advertisement communication 160-1 is in the form of a modified system information message.

A system information message is an overhead communication that is used in cellular telephony for a radio access point 155 to configure (but not necessarily to establish) communication with User Equipment (UE), such as an AV 110. As such, system information messages pertain to configuring a physical-layer of communication and are capable of being received and processed without a UE having registered, being able to register, and/or establishing a network data session, with a cellular telecommunication network.

The modified system information message is a system information message that comprises additional fields, which are intelligible to the plurality of AVs 110, to advertise a request for assistance with delivering a payload and to facilitate such requested assistance. The advertisement communication 160-1, in the form of a modified system information message, is available to comprise the same information as the advertisement communication 160-1 described with reference to FIG. 3. As such, new fields are provided as part of the modified system information message to represent such information, and the AVs are configured so as correctly to interpret these new fields. The modified system information message is available to include a modified Master Information Block (MIB) and/or a modified System Information Block (SIB) message, including any of Types 1 to 13, for example as described in 3GPP Technical Specification 36.331, version 15.4.0, section 5.2.

The advertisement communication 160-1 is received by the receiving AVs, including the second AV 110-2, which are within a reception range of the first radio access point 155-1.

In the example of FIG. 4, only the first AV 110-1 is a subscriber of the telecommunication network with which the first radio access point is exclusively associated. The remaining AVs, including the second AV 110-2, are not subscribers of the first telecommunications network, and therefore cannot establish a data bearer session via the first radio access point 155-1. Accordingly, being in the form of a modified system information message allows the second AV 110-2 to receive and to process the advertisement communication 160-1 from the first radio access point 155-1, despite the second AV 110-2 being unable to access (as a non-subscriber of) the first telecommunication network.

In this way, there is provided a means of alerting an AV 110 to assist with delivery that is capable of alerting AVs 110 regardless of which telecommunications network they are capable of accessing in their local vicinity.

Upon receipt of the advertisement communication 160-1 by the receiving AV 110, processing is performed by the receiving AV to determine whether it is suitable for retrieving the payload 120 from the first intermediate destination 140-1, for example as per the process described with reference to FIG. 3.

If a receiving AV determines that it is suitable to retrieve the payload 120, such a receiving AV responds to the advertisement communication 160-1 with an acceptance communication 160-2 to identify itself as being capable of assisting with delivering the payload; this acceptance communication 160-2 is issued by the second AV 110-2. If not, then the receiving AV does not issue any response.

Since the second AV 110-2 is not a subscriber of the first telecommunications network, the second AV is unable to register with the first telecommunications network and therefore to issue the acceptance communication 160-2 via the first radio access point 155-1. The second AV is instead a subscriber of a second telecommunication network (not shown), with which a second radio access point 155-2 is exclusively associated. As a result, the second AV communicates the acceptance communication 160-2 via the second telecommunications network, and in particular via the second radio access point 155-2 by means of a data bearer session or a Radio Resource Control (RRC) message.

Once the acceptance communication 160-2 has been received, the second telecommunication network communicates the acceptance communication 160-2 to the first telecommunication network (not shown in FIG. 4), thereby to cause cessation of the broadcasting of the advertisement communication 160-1 by the first radio access point 155-1.

The acceptance communication 160-2 is communicated by the second telecommunications network to the appropriate entity (such that the Control Centre 150 or the first AV 110-1) so to identify the selected AV. In the example of FIG. 4, the Control Centre, in communication with the second telecommunications network, selects the second AV 110-2. To this end, the second telecommunications network, by means of the second radio access point 155-2, communicates a selection message 160-3 to the selected AV (i.e. the second AV 110-2), which triggers the selected AV to assist with delivering the payload (i.e. processing proceeds as from step 260 of process 200).

With reference to FIGS. 3 and 4, the advertisement communication 160-1 is available also to comprise information, including:

an identifier that uniquely identifies the first AV 110-1, such as an International Mobile Equipment Identity (IMEI);

a current geographical location of the first AV 110-1 (e.g. determined via GPS);

a speed or velocity of the first AV 110-1 and/or an expected time-to-destination (i.e. the first intermediate destination);

information regarding delivering the payload 120, for example including:

an importance-level or a priority-level of the delivery (e.g. a low-priority delivery, such as for a basic consumer good, or a high-priority delivery, such as blood for transfusion);

a route to be taken to the intended destination (e.g. a fastest or a most energy-efficient route);

information regarding the payload 120, including:

dimensions;

mass;

orientation with which it is to be handled;

a frangibility-level of the payload;

a danger-level of the payload (e.g. containing toxic chemicals or explosives, such as in the case of fireworks); and/or whether the payload is a plurality of individual items, the number of such items (as well as any of the aforementioned information as applicable to each such item) and/or the individual items that are to be recovered, if not all.

The aforementioned information within the advertisement communication 160-1 is available to be used to identify the selected AV. In one example, process 200 is available to override an AV 110's present task (such as a delivery or re-charging) so as to identify that AV as the selected AV; this may be advantageous where one delivery takes precedence over another (such as for time-critical deliveries, including blood for transfusion).

The processes shown in, and described with reference to, FIGS. 3 and/or 4 are available to be performed by subsequent AVs 110 that are selected to retrieve the payload, for example such that: the role of the first AV 110-1 is replaced by the second AV 110-2, and the role of the second AV 110-2 is available to be replaced by the third AV 110-3 in a first re-iteration of process 200; and the role of the second AV 110-2 is replaced by the third AV 110-3, and the role of the third AV 110-3 is available to be replaced by the fourth AV 110-3 in a second re-iteration of process 200.

Alternatives and Modifications

In FIG. 1, the AVs 110 are shown as so-called drones. In another example, the AVs include autonomous or semi-autonomous vehicles of any kind, such as: ground vehicles (including hovercraft and subterranean vehicles); marine vehicles (including submarines); aerial vehicles (including space vehicles); and hybrid such vehicles.

In the description above, a suitable intermediate destination 140 is within a travel range of the first AV 110-1 and brings the payload closer to the intended destination 130-2. However, in an alternative, the intermediate destination 140 is available to bring the payload further away or no closer to the intended destination 130-2, but provides for a faster, safer, less congested and/or less disruptive route to and/or from the intermediate destination 130-2.

In one example, the wireless communications 160 are encrypted, or include encrypted data, so that they are readable only by AVs that have been registered or opted in to help perform the delivery process described above.

In one example, an intermediate location 140 is available to be pre-defined.

In the examples of FIGS. 3 and 4, only a single AV—the second AV 110-2—responds with an acceptance communication 160-2. Where multiple acceptance communications 160-2 are received, the selected AV is identified on the basis of: first respondent; closest respondent; and/or the most capable respondent in terms of delivering the payload to the intended destination. Accordingly, the acceptance communication 160-2 is available also to include information about the responding AV pertaining to its current location, capabilities and/or travel range.

With reference to FIG. 4, in an alternative, the first radio access point 155-1 (as opposed to any other radio access point of the first telecommunications network) is selected to broadcast the advertisement communication based on the first AV 110-1 currently being registered with the first radio access point 155-1.

Each feature disclosed herein, and (where appropriate) as part of the claims and drawings may be provided independently or in any appropriate combination.

Any reference numerals appearing in the claims are for illustration only and shall not limit the scope of the claims.

The invention claimed is:

1. A computer-implemented method of controlling Autonomous Vehicles (AVs) for delivering a payload to an intended delivery location comprising the steps of:

identifying a first AV for retrieving a payload from a first location;

determining a second location to which the first AV is capable of travelling with the payload from the first location;

instructing the first AV to retrieve the payload from the first location and to deliver the payload to the second location;

communicating a wireless advertisement communication from a first radio access point requesting assistance from another AV to deliver the payload from the second location, wherein the wireless advertisement communication is in the form of a System Information Block (SIB) and/or a Master Information Block (MIB);

in response to the wireless advertisement communication, identifying a second AV for retrieving the payload from the second location; and instructing the second AV to retrieve the payload from the second location and to deliver the payload to the intended delivery location, wherein the first AV is a subscriber of a first telecommunications network with which the first radio access point is exclusively associated and the second AV is a subscriber of a second telecommunications network with which a second radio access point is exclusively associated, and the wireless advertisement communication allows the second AV to receive and process the wireless advertisement communication despite the second AV not being a subscriber of the first telecommunications network and being unable to access the first telecommunication network.

2. The computer-implemented method according to claim 1, wherein the first AV is registered with said first radio access point.

3. The computer-implemented method according to claim 1, wherein the wireless advertisement communication comprises the second location and/or the intended delivery location.

4. The computer-implemented method according to claim 1, wherein the second location is determined in dependence upon a maximum travel range of the first AV.

5. The computer-implemented method according to claim 1, further comprising the step of retrieving capability information regarding a capability of the second AV to retrieve the payload and to deliver said payload to the intended delivery location, and identifying and/or instructing the second AV in dependence on said capability information.

6. The computer-implemented method according to claim 1, wherein the step of determining the second location is performed by the first AV.

7. The computer-implemented method according to claim 1, wherein the step/s of identifying and/or instructing the second AV is/are performed by the first AV.

8. The computer-implemented method according to claim 7, wherein the step of identifying the second AV further comprises the steps of:

broadcasting the wireless advertisement communication; and in response to the wireless advertisement communication, receiving a reply from the second AV, wherein the second AV is identified in dependence on the reply.

9. The computer-implemented method according to claim 1, wherein the second location is closer to the intended delivery location than the first location.

10. The computer-implemented method according to claim 1, wherein the first AV is carrying one or more payload/s to one or more intended delivery location/s, and wherein a plurality of second AVs are identified and instructed to retrieve and to deliver the one or more payload/s to the one or more intended delivery location/s.

11. The computer-implemented method according to claim 1, wherein the wireless advertisement communication comprises a priority level for a delivery, and wherein said identifying of the second AV is performed in dependence on said priority level.

12. The computer-implemented method according to claim 1, wherein the first and/or the second AV is/are unmanned.

13. The computer-implemented method according to claim 1, wherein the first and/or the second AV is/are an aerial, marine and/or ground vehicle/s.

14. A non-transitory storage medium carrying computer-readable code representing instructions for causing at least one processor to perform the steps according to claim 1 when the instructions are executed by the at least one processor.

15. The computer-implemented method according to claim 1, wherein the second location is determined in dependence upon a location of the second AV.

16. The computer-implemented method according to claim 1, wherein the wireless advertisement communication comprises a current geographical location of the first AV.

17. The computer-implemented method according to claim 1, wherein the wireless advertisement communication comprises a velocity of the first AV.

18. The computer-implemented method according to claim 1, wherein the second AV cannot establish a data bearer session via the first radio access point.

19. The computer-implemented method according to claim 1, further comprising communicating an acceptance communication from the second AV via the second telecommunications network and the second radio access point, the acceptance communication being indicative of a determination of the second AV being suitable for retrieving the payload from the second location.

* * * * *